(12) United States Patent
Tonegawa

(10) Patent No.: US 8,486,262 B2
(45) Date of Patent: Jul. 16, 2013

(54) ECO-RESOURCE SLAG EFFECTIVE UTILIZATION SYSTEM

(75) Inventor: Jiro Tonegawa, Sumida-ku Tokyo (JP)

(73) Assignee: Kantokanzai Co., Ltd., Tokyo (JP)

( * ) Notice: Subject to any disclaimer, the term of this patent is extended or adjusted under 35 U.S.C. 154(b) by 464 days.

(21) Appl. No.: 12/912,994

(22) Filed: Oct. 27, 2010

(65) Prior Publication Data

US 2011/0180488 A1 Jul. 28, 2011

(30) Foreign Application Priority Data

Jan. 22, 2010 (JP) ................................ 2010-011636

(51) Int. Cl.
*C02F 1/78* (2006.01)
(52) U.S. Cl.
USPC ......................................................... 210/192
(58) Field of Classification Search
USPC ......................................................... 210/192
See application file for complete search history.

(56) References Cited

FOREIGN PATENT DOCUMENTS

| JP | 6-134454 A | 5/1994 |
|----|-----------|--------|
| JP | 11-10140 A | 1/1999 |

*Primary Examiner* — Chester Barry
(74) *Attorney, Agent, or Firm* — Holtz, Holtz, Goodman & Chick, PC

(57) ABSTRACT

Slags, including the harmful-substance-containing slags, are not directly melted but are neutralized and processed into eco-resource materials, so that the slugs can be effectively utilized to purify and revive a large area of polluted water without any burden on the environment. Predetermined proportions of a non-recyclable harmful-substance-containing unused slag selected from by-product slags produced during the refining of a metal such as iron, copper, or aluminum from an ore, a porcelain clay for ceramics, and a mineral clay for ceramics, such as a quartz powder or an alumina powder, are kneaded to form a clay material with a suitable size. The clay material is burnt in a burning oven for ceramics at a predetermined temperature for a predetermined period of time so that a liquid glaze can sufficiently penetrate into the inner region of the clay material, thereby forming a biscuit clay material. A liquid glaze produced by kneading a powder made from a crushed special natural stone with a glaze for ceramics in a predetermined ratio followed by aging is applied, for example, to the biscuit clay material. As a result, a harmful-substance-containing unused slag is neutralized and used as an eco-resource filter medium.

20 Claims, 16 Drawing Sheets

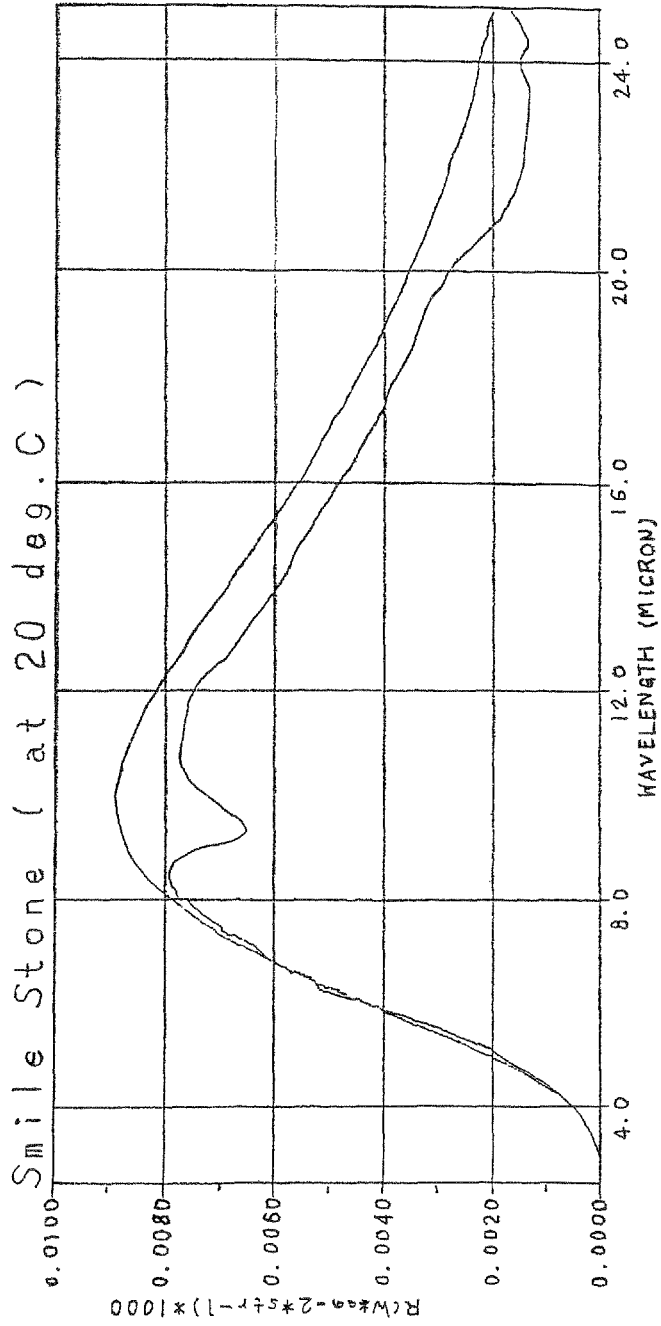

Fig. 27

| ANALYSIS ITEM/SPECIMEN NAME | | FILTER MEDIUM A (BLAST FURNACE) | FILTER MEDIUM B (IRON MANUFACTURE) | ANALYTICAL METHOD | VOLUMETRIC LOWER LIMIT |
|---|---|---|---|---|---|
| CADMIUM COMPOUND | (mgCd/L) | ND<0.001 | ND<0.001 | JIS K0102 55.3 | 0.001 |
| LEAD OR ITS COMPOUND | (mgPb/L) | ND<0.001 | ND<0.001 | JIS K0102 54.3 | 0.001 |
| HEXAVALENT CHROMIUM COMPOUND | (mgCr(VI)/L) | ND<0.005 | ND<0.005 | JIS K0102 65.2.4 | 0.005 |
| ARSENIC OR ITS COMPOUND | (mgAs/L) | 0.001 | ND<0.001 | JIS K0102 61.2 | 0.001 |
| MERCURY OR ITS COMPOUND | (mgHg/L) | ND<0.005 | ND<0.0005 | NOTIFICATION OF ENVIRONMENT AGENCY, NO.59, APPENDIX 1 | 0.0005 |
| SELENIUM OR ITS COMPOUND | (mgSe/L) | ND<0.001 | ND<0.001 | JIS K0102 67.2 | 0.001 |

ND: (NOTE) LESS THAN A VOLUMETRIC LOWER LIMIT

ECO-RESOURCE SLAG EFFECTIVE UTILIZATION SYSTEM

BACKGROUND OF THE INVENTION

1. Field of the Invention

The present invention relates to the field of eco-resource slag effective utilization systems.

2. Description of the Related Art

Steel slags produced during an ore milling process, burned ash slags generated in garbage incineration plants, sludge slags generated in sewage treatment plants, coke incineration residues generated in thermal power generation plants, incineration ash slags generated from incineration of livestock excreta, and the like used in the present invention are usually processed into "molten slag" in a melting high-temperature burning furnace (oven) in the plant.

Further, out of 38 million tons of steel slags produced in iron-making factories (every year) by the processing of such slags into molten slags, about 390,000 tons of slags remain unused and kept as the special management industrial waste in plant sites in the country, because harmful substances, such as heavy metal, cannot be completely removed therefrom even when processed into molten slags, and there has been no effective way of utilization.

Other slags also have problems in that although they are applicable in the form of molten slag aggregates as products for so-called land civil engineering works, such as roadbed materials and like alternative concrete products, they are not suitable for use as products for water civil engineering works, such as for the purification of contaminated water.

Some attempts have been made where a slag is formed into the shape of a block and installed underwater to the ocean so as to achieve the implantation of seaweeds and corals. However, there are problems in that due to the rise in the sea water temperature, the contamination of the water area, and like causes, such attempts have not been as effective as expected.

JP-A-11-10140 discloses an example of a conventional water purification material. The core 2 of such a water purification material 1 is granules of a ceramic powder.

Further, JP-A-6-134454 discloses an example of a conventional water purification apparatus. However, water purification the ceramics 6a and 6b used in the water purification apparatus are not made from steel slags produced during an ore milling process, burned ash slags generated in garbage incineration plants, sludge slags generated in sewage treatment plants, coke incineration residues generated in thermal power generation plants, or incineration ash slags generated from incineration of livestock excreta.

SUMMARY OF THE INVENTION

An object of the present invention is to provide a system in which slags, including the harmful-substance-containing slags mentioned above, are not directly melted but are neutralized and processed into eco-resource materials, so that the slugs can be effectively utilized to purify and revive a large area of polluted water without any burden on the environment.

As a means for solving the problems mentioned above, a first embodiment of the invention provides an eco-resource slag effective utilization system for neutralizing a harmful-substance-containing unused slag to allow the same to be used as an eco-resource filter medium, the eco-resource slag effective utilization system comprising:

a first step of kneading predetermined proportions of a non-recyclable harmful-substance-containing unused slag selected from by-product slags produced during the refining of a metal such as iron, copper, or aluminum from an ore, a porcelain clay for ceramics, and a mineral clay for ceramics, such as a quartz powder or an alumina powder, thereby forming a clay material with a suitable size;

a second step of burning the clay material in a burning oven for ceramics at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a forth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics again at a predetermined temperature for a predetermined period of time, so that a harmful component contained in the unused slag is melted and enclosed in a vitreous material, thereby forming a vitreous filter medium made of a vitreous solid matter capable of purifying and restoring contaminated or polluted water; and a sixth step of installing the filter medium formed in the fifth step underwater in a contaminated water area to purify water and revive normal water.

As a means for solving the problems mentioned above, a second embodiment of the invention provides an eco-resource slag effective utilization system for neutralizing a harmful-dioxin-containing waste incineration ash slag that has not been processed into a molten slag, thereby allowing the same to be used as an eco-resource filter medium, the eco-resource slag effective utilization system comprising:

a first step of kneading predetermined proportions of a harmful-dioxin-containing slag that has not been processed into a molten slag, which is selected from waste incineration ash slags generated during the burning of general wastes in a combustible waste incineration plant, a porcelain clay for ceramics, and a mineral clay for ceramics, such as a quartz powder or an alumina powder, thereby forming a clay material with a suitable size;

a second step of burning the clay material in a burning oven for ceramics or wastes at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a forth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics or wastes at a predetermined temperature for a predetermined period of time, so that a harmful component contained in the harmful-dioxin-containing slag is melted and enclosed in a vitreous material, thereby forming a vitreous filter medium made of a vitreous solid matter capable of purifying and restoring contaminated or polluted water; and a sixth step of installing the filter medium formed in the fifth step underwater in a contaminated water area to purify water and revive normal water.

As a means for solving the problems mentioned above, a third embodiment of the invention provides an eco-resource slag effective utilization system for neutralizing a harmful-component-containing unprocessed sludge slag to allow the same to be used as an eco-resource filter medium, the eco-resource slag effective utilization system comprising:

a first step kneading predetermined proportions of a harmful component-containing sludge slag that has not been processed into a sludge molten slag, which is selected from sewage sludge slags generated during the production of sewage sludge in a sewage treatment plant, a porcelain clay for ceramics, and a mineral clay for ceramics, such as a quartz powder or an alumina powder, thereby forming a clay material with a suitable size;

a second step of burning the clay material in a burning oven for ceramics or melting at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a forth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics or melting again at a predetermined temperature for a predetermined period of time, so that a harmful component contained in the sludge slag is melted and enclosed in a vitreous material, thereby forming a vitreous filter medium made of a vitreous solid matter capable of purifying and restoring contaminated or polluted water; and a sixth step of installing the filter medium formed in the above step underwater in a contaminated water area to purify contaminated water or the like and revive normal water.

As a means for solving the problems mentioned above, a fourth embodiment of the invention provides an eco-resource slag effective utilization system for neutralizing a harmful-component-containing coke slag to allow the same to be used as an eco-resource filter medium, the eco-resource slag effective utilization system comprising a first step of:

installing a slag obtained by finely pulverizing a harmful-component-containing coke incineration residue generated during the burning of coals in a thermal power generation facility, together with a filter medium made from the coke incineration residue slag in the same manner as in the steps 1 to 5 of the production of a solid matter in any one of claims 1 to 3, underwater in a contaminated water area to purify contaminated water or the like and revive normal water.

As a means for solving the problems mentioned above, a fifth embodiment of the invention provides an eco-resource slag effective utilization system for neutralizing a harmful-component-containing livestock excreta slag to allow the same to be used as an organic eco-resource filter medium, the eco-resource slag effective utilization system comprising a first step of:

finely pulverizing an excreta slag obtained by drying and burning harmful excreta from livestock such as cows and pigs, together with a filter medium made from the excreta slag in the same manner as in the steps 1 to 5 of the production of a solid matter in any one of claims 1 to 3, into granules; and mixing the granules in the soil with a spade to enrich the soil and revive normal soil.

As a means for solving the problems mentioned above, a sixth embodiment of the invention provides an eco-resource slag effective utilization system for allowing an eco-resource filter medium obtained by neutralizing a harmful slag to be effectively used as a beach-graveling/nourishing resource, the eco-resource slag effective utilization system comprising, with respect to an eroded area of a coastal sand hill:

mixing coastal sand-hill residual sand and a slag filter medium obtained in any one of claims 1 to 5 in a predetermined ratio; and using the resulting mixture to gravel an eroded area of a sand hill, so as to revive parts eroded by a high wave and prevent such erosion.

As a means for solving the problems mentioned above, a seventh embodiment of the invention provides an eco-resource slag effective utilization system for allowing an eco-resource filter medium obtained by neutralizing a harmful slag to be effectively used as a resource for removing contaminated water flowing into an existing sewerage drainage ditch, the eco-resource slag effective utilization system comprising, with respect to an existing sewage drainage ditch for living drainage, municipal drainage, industrial drainage, or the like, a first step of:

enclosing a slag filter medium obtained in any one of claims 1 to 5 in a mesh bag, a wire mesh cage, for the like followed by underwater installation or hanging of the enclosing bag or cage in an existing sewage drainage ditch, thereby removing an offensive odor in the drainage ditch and purifying contaminated water flowing into the drainage ditch.

As a means for solving the problems mentioned above, an eighth embodiment of the invention provides an eco-resource slag effective utilization system, comprising, with respect to a contaminated water area in a river, a pond, a lake, the ocean, or the like:

kneading, together with water, a slag solid matter obtained in any one of claims 1 to 5 and a fine powder of a steel slag and a blast furnace slag produced as by-products in a steelmaking process, followed by solidification of the resulting mixture by a hydration reaction, and further fine pulverization of the resulting solid;

mixing the resulting product with natural sand for use in civil engineering works in a predetermined ratio, following by kneading with additional water and casting into a mold with a suitable size and a suitable shape, thereby forming a concrete filter medium;

exposing only the kneaded filter medium to the outside by treating a half-dry surface of the concrete solid matter with a technique such as washing away by the application of a hydraulic pressure, scraping off with a wire brush, or the like, thereby forming a block for underwater installation, a wave-dissipating block, a block for shore protection works, or the like; and using the resulting blocks successively from an upstream in a headwater area to the downstream ocean in a final flow-in area in such a manner that the blocks contact contaminated water in a fresh water area, a seawater area, a brackish water area, or the like, thereby allowing the same to be effectively used as a resource for purifying and reviving a contaminated water area.

As a means for solving the problems mentioned above, a ninth embodiment of the invention provides an eco-resource slag effective utilization system, comprising, with respect to a road surface material for paving a sidewalk or the like, such as an interlocking block or an exterior tile:

mixing a slag filter medium obtained in any one of claims 1 to 5, a ground product of the steelmaking slag or hydrated solidified body, and natural sand for use in civil engineering works in a predetermined ratio, followed by addition of water and casting into a mold in the shape of an interlocking block or a tile, thereby forming a road surface material;

exposing only the kneaded filter medium to the outside with a technique such as washing away by the application of a hydraulic pressure, scraping off, or the like as above, followed by drying;

polishing a surface of the resulting dried product using a polishing machine or the like to make the surface flat; and using the resulting product as a material for paving the surface of a road such as a sidewalk or the like in the same manner as in ordinary pavement using an interlocking block or an exterior tile, thereby allowing the same to be efficiently used as a resource for reducing heat island effects on a paved road surface and purifying a contaminant or the like that floods a paved road surface.

As a means for solving the problems mentioned above, a tenth embodiment of the invention provides an eco-resource slag effective utilization system for allowing an eco-resource filter medium obtained by neutralizing a harmful slag to be used as a resource for removing a BOD component contained in livestock urine, the eco-resource slag effective utilization system comprising, with respect to livestock excreta of cows, pigs, and the like:

in a urine disposal method, filtering livestock urine two or three times through a slag filter medium obtained in any one of claims 1 to 5 and a predetermined amount of the filter medium enclosed in a filtration apparatus made of a wire mesh or the like so as to achieve a reduction of a harmful BOD component contained in the urine, thereby simplifying ordinary excreta disposal and enabling the discharge of harmless urine.

The first embodiment of the invention is advantageous in the following respect. A non-recyclable harmful-substance-containing unused slag selected from by-product slags produced during the refining of a metal such as iron, copper, or aluminum from an ore is processed through the first to fifth steps to form a filter medium made of a vitreous solid matter capable of purifying and restoring contaminated or polluted water. The filter medium is installed underwater in a contaminated water area. As a result, it is possible to purify and revive normal water. Also, the unused slag containing a substance that is originally harmful can be neutralized, allowing the same to be effectively used as an eco-resource filter medium.

The second embodiment of the invention is advantageous in the following respect. A harmful-dioxin-containing slag that has not been processed into a molten slag, which is selected from waste incineration ash slags generated during the burning of general wastes in a combustible waste incineration plant, is processed through the first to fifth steps to form a filter medium made of a vitreous solid matter capable of purifying and restoring contaminated or polluted water. The filter medium is installed underwater in a contaminated water area. As a result, it is possible to purify and revive normal water. Also, the unused slag containing a dioxin that is originally harmful can be neutralized, allowing the same to be effectively used as an eco-resource filter medium.

The third embodiment of the invention is advantageous in the following respect. A harmful component-containing sludge slag that has not been processed into a sludge molten slag, which is selected from sewage sludge slags generated during the production of sewage sludge in a sewage treatment plant, is processed through the first to fifth steps to form a filter medium made of a vitreous solid matter capable of purifying and restoring contaminated or polluted water. The filter medium is installed underwater in a contaminated water area. As a result, it is possible to purify and revive normal water. Also, the sludge slag containing a component that is originally harmful can be neutralized, allowing the same to be effectively used as an eco-resource filter medium.

The fourth embodiment of the invention is advantageous in the following respect. A slag obtained by finely pulverizing a harmful-component-containing coke incineration residue generated during the burning of coals in a thermal power generation facility is processed in the same manner as in the first to fifth steps of the production of the solid matter of the first to third embodiments so as to form a filter medium made of a vitreous solid matter capable of purifying and restoring contaminated or polluted water. The filter medium is installed underwater in a contaminated water area. As a result, it is possible to purify and revive normal water. Also, a slag formed by finely pulverizing a coke incineration residue containing a component that is originally harmful can be neutralized, allowing the same to be effectively used as an eco-resource filter medium.

The fifth embodiment of the invention is advantageous in the following respect. An excreta slag produced by drying or combustion during an extraction processing of harmful excreta of livestock such as cows and pigs is processed in the same manner as in the first to fifth steps of the production of the solid matter of the first to third embodiments. The filter medium made from the excreta slag is finely pulverized into granules and mixed in the soil with a spade to enrich the soil. As a result, normal soil can be revived. Also, the harmful-component-containing livestock excreta slag is neutralized and allowed to be used as an organic eco-resource filter medium.

The sixth embodiment of the invention is advantageous in the following respect. With respect to an eroded area of a coastal sand hill, coastal sand-hill residual sand and a slag filter medium obtained in any one of claims 1 to 5 are mixed in a predetermined ratio, and the resulting mixture is used to gravel the eroded area of a sand hill. As a result, it is possible to revive parts eroded by a high wave and prevent such erosion. Also, the eco-resource filter medium obtained by neutralizing a harmful slag is allowed to be effectively used as a beach-graveling/nourishing resource.

The seventh embodiment of the invention is advantageous in the following respect. Using a slag filter medium obtained in any one of claims 1 to 5, the filter medium is stored in a mesh bag, a wire mesh cage, or the like, and the mesh bag, the wire mesh cage, or the like containing the filter medium is installed underwater or hung in an existing sewage drainage ditch. As a result, it is possible to remove an offensive odor in the drainage ditch and purify the contaminated water flowing into the drainage. Also, the eco-resource filter medium obtained by neutralizing a harmful slag is allowed to be effectively used as a resource for removing contaminated water flowing into an existing sewerage drainage ditch.

The eighth embodiment of the invention is advantageous in the following respect. A slag filter material obtained in any one of claims 1 to 5 and a fine powder of a steel slag and a blast furnace slag produced as by-products in a steelmaking process are kneaded with water, solidified by a hydration reaction, and then further finely pulverized. The resulting product is mixed with natural sand for use in civil engineering works in a predetermined ratio, following by kneading with additional water and casting into a mold with a suitable size and a suitable shape, thereby forming a concrete filter medium. Only the kneaded filter medium is exposed to the outside by treating a half-dry surface of the concrete filter medium with a technique such as washing away by the application of a hydraulic pressure, scraping off with a wire brush, or the like, thereby forming a block for underwater installation, a wave-dissipating block, a block for shore protection works, or the like. The resulting blocks may be successively used from an upstream in a headwater area to the downstream ocean in a final flow-in area in such a manner that the blocks contact contaminated water in a fresh water area, a seawater area, a brackish water area, or the like, thereby achieving purification and revival of the contaminated water area. Also such blocks can be effectively used as a resource for purifying and reviving a contaminated water area.

The ninth embodiment of the invention is advantageous in the following respect. A slag filter medium obtained in any one of claims 1 to 5, a ground product of the steelmaking slag or hydrated solidified body, and natural sand for use in civil engineering works in a predetermined ratio are mixed, followed by addition of water and casting into a mold in the shape of an interlocking block or a tile, thereby forming a road surface material. Only the kneaded filter medium is exposed to the outside with a technique such as washing away by the application of a hydraulic pressure, scraping off, or the as above, followed by drying. The surface of the resulting dried product is polished using a polishing machine or the like to make the surface flat. The resulting product is used as a material for paving the surface of a road such as a sidewalk or the like in the same manner as in ordinary pavement using an interlocking block or an exterior tile. Thereby allowing the same to be efficiently used as a resource for reducing heat island effects on a paved road surface and purifying a contaminant or the like that floods a paved road surface.

The tenth embodiment of the invention is advantageous in the following respect. Livestock urine is filtered two or three times through a slag filter medium obtained in any one of claims 1 to 5 and a predetermined amount of the filter medium enclosed in a filtration apparatus made of a wire mesh or the like. As a result, a harmful BOD component contained in the urine can be reduced. Also, ordinary excreta disposal is simplified and the discharge of harmless urine is enabled.

This embodiment is also advantageous in that an eco-resource filter medium obtained by neutralizing a harmful slag is allowed to be used as a resource for removing a BOD component contained in livestock urine.

BRIEF DESCRIPTION OF THE DRAWINGS

FIG. 12 is a plan view showing the condition of use of the molded article of FIG. 11.

FIG. 13 is a front view showing the condition of use of concrete cases in a pile formed by packing with the filter medium of FIG. 1, as installed underwater.

FIG. 22 shows results of the measurement of the infrared spectral emissivity (at 20° C.) of the filter medium of FIG. 1.

FIG. 23 is a perspective view of a steelmaking (iron) slag before the high-temperature treatment with a glaze.

FIG. 24 is a perspective view of a steelmaking (iron) slag after the high-temperature treatment with a glaze.

FIG. 25 is a perspective view of a blast furnace slag before the high-temperature treatment with a glaze.

FIG. 26 is a perspective view of a blast furnace slag after the high-temperature treatment with a glaze.

FIG. 27 is a table showing the results of the analysis of the slags of FIGS. 24 and 26.

DESCRIPTION OF THE PREFERRED EMBODIMENTS

Figure 1:
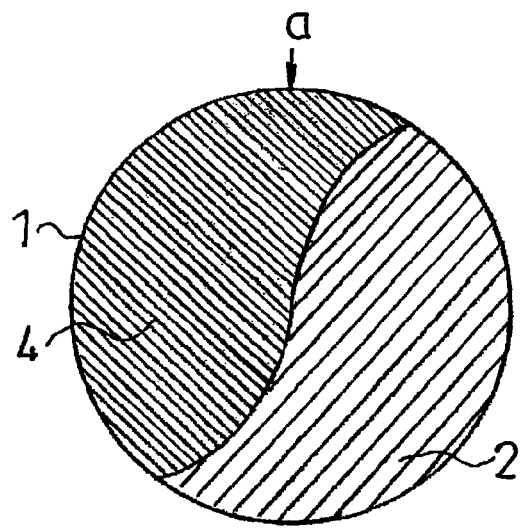
FIG. 1 is a longitudinal section of a filter medium capable of purifying and restoring contaminated or polluted water, which is formed through the first to fifth steps according to the eco-resource slag effective utilization system of the present invention.

The first to tenth embodiments of the present invention have some parts in common, so will be collectively described as follows.

The filter medium a capable of purifying and restoring contaminated or polluted water, which is constitutionally important in the present invention, is greatly different from a conventional filter medium b capable of purifying and restoring contaminated or polluted water in terms of the production process, the operation, and the effects.

An earthenware core 3 (clay) that forms the conventional filter medium b is obtained by a first step of calcining predetermined amounts of a clay and a porcelain clay at a predetermined high temperature for a predetermined period of time to form an earthenware material, and a second step of applying a liquid glaze 4 to a surface region 3a of the resulting product, followed by calcination at a predetermined high temperature for a predetermined period of time.

As a result, the earthenware core 3 (clay) is calcined in such a state that the liquid glaze 4 is only attached to the surface region 3a thereof and does not sufficiently penetrate into the inner region.

Therefore, when the filter medium b breaks due to an external shock or the like, because the inside thereof is not impregnated with the liquid glaze, its functions to purify and restore contaminated or polluted water are not exhibited sufficiently.

Further, when the filter medium b is pulverized and used as a powder, because the inside thereof is not impregnated with the liquid glaze, its functions to purify and restore contaminated or polluted water are remarkably decreased.

In contrast, the filter medium a of the present invention is greatly different from the conventional filter medium b in terms of the production process. The process will be specifically described hereinafter.

That is, in order to form the filter medium a of the present invention, it is necessary to produce a liquid glaze previously.

The following describes the liquid glaze.

Main components of the liquid glaze of the present invention are natural ores (e.g., volcanic rock, basalt, granite). Such natural ores contain large amounts of various elements, have a fine continuous porous structure together with electrostatic energy, have hydrophilicity, are capable of various ion generation and oxidation reduction, and are also capable of rendering a harmful substance harmless.

In addition, molecules of silicon, aluminum, iron, and the like and formed into colloids (small particles), and this promotes purification and activation of water, providing a functions to indirectly inhibit the growth of harmful microbes.

Further, according to fluorescent X-ray analysis, it was detected that components of natural ores for use in the production of the liquid glaze of the present invention are elements such as Si, Al, Fe, Ca, K, Na, Ti, P, S, Mn, Cr, Sr, Cl, Rb, Zr, Ni, Y, Zn, Ga, and As.

The natural stone mentioned above contains moisture from the time of its production in the form of a layer or at the time of crystallization.

In order for electrostatic energy to efficiently radiate outside, it is necessary to perform a primary treatment of calcination to about 800° C. or more in a high-temperature oven, thereby removing moisture-containing crystals.

Therefore, the natural ore is pulverized and calcined at a temperature based on the comprehensive reconstruction temperature to remove the moisture content, and then further finely pulverized into a powder.

Based on a glaze for ceramics (SrO, $TiO_2$, CoO, FeO, $Fe_2O_3$, etc.) (commercially available), 90 to 95 wt % of a natural ore mineral component and 5 to 10 wt % of a glaze component or 80 to 95 wt % of a mineral component and 5 to 20 wt % of a glaze component are added thereto. A predetermined amount of water is then added, and the mixture is kneaded and aged. As a result, a liquid glaze is formed.

The above is a liquid glaze used in the present invention.

Next, the formation of the filter medium a that manages the purification of contaminated water will be described.

The formation of a clay material p, the first step of the present invention, is performed by kneading a slag s, which is a slag generated in a garbage incineration plant, a sludge slag generated in a sewage disposal plant, a slag discharged from an iron-making/refining plant, coal fly ash generated during thermal power generation, or a slag generated during the process of slag formation from livestock excreta incineration ash, with a porcelain clay for ceramics and a clay for ceramics.

The clay material p is formed by kneading the mixture in the following ratio: 20 to 25 wt % of the finely pulverized slag s, 40 to 45 wt % of the porcelain clay, and 40 to 45 wt % of the clay.

In the present invention, the size of the clay material p is not limited in terms of shape, and it may be in the form of a bar, a rectangle, etc. Such a material is manually torn to pieces with a diameter of about 10 to 15 mm.

The clay material p is dried and calcined in a high-temperature kiln k at a temperature near 800° C. for 12 to 15 hours to give a biscuit clay material.

Then, the above-obtained liquid glaze is applied to the entire surface of the thus-obtained biscuit clay material in a liquid glaze impregnation bath R, whereby the liquid glaze penetrates into the inner region. The amount of penetration is about 10 times larger than the amount of a conventional earthenware clay material 3. Then, drying is further performed.

The dried biscuit clay material impregnated with the liquid glaze is melted and calcined again in a high-temperature kiln k at a high temperature of about 1200 to 1300° C. for 12 to 15 hours, whereby a vitreous filter medium a is formed. As a result, the slag s, which is a harmful substance, is enclosed in a vitreous inner region 2 and is prevented from eluting outside.

Further, the filter medium a is used directly or in a pulverized form for the purification of contaminated or polluted water. Even when the filter medium a of the present invention is used in a finely pulverized form as mentioned above, because a considerable amount of the glaze penetrates thoroughly inside the filter medium after the formation of the biscuit clay material p, the fine powder can also sufficiently exhibit the functions to purify and restore contaminated or polluted water.

Figure 2:
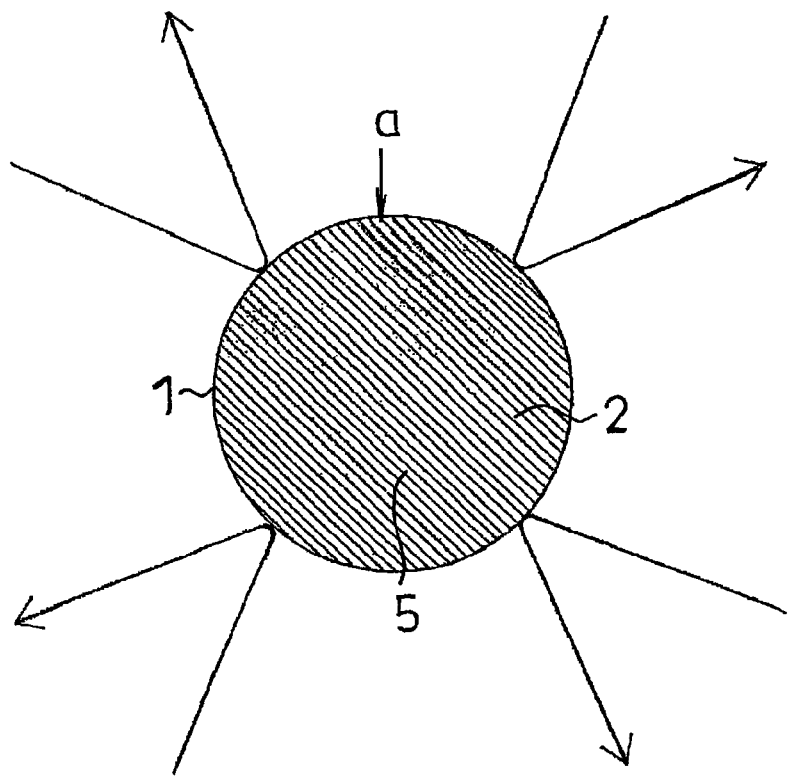
FIG. 2 is a longitudinal section illustrating the purification mechanism by the decomposition and breakdown activity of the filter medium of FIG. 1 on contaminated water.
Figure 3:
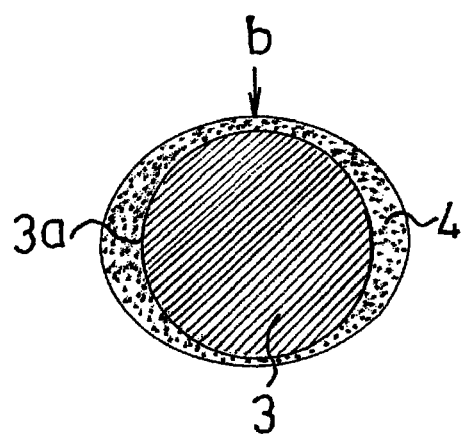
FIG. 3 is a longitudinal section of a conventional filter medium.
Figure 4:
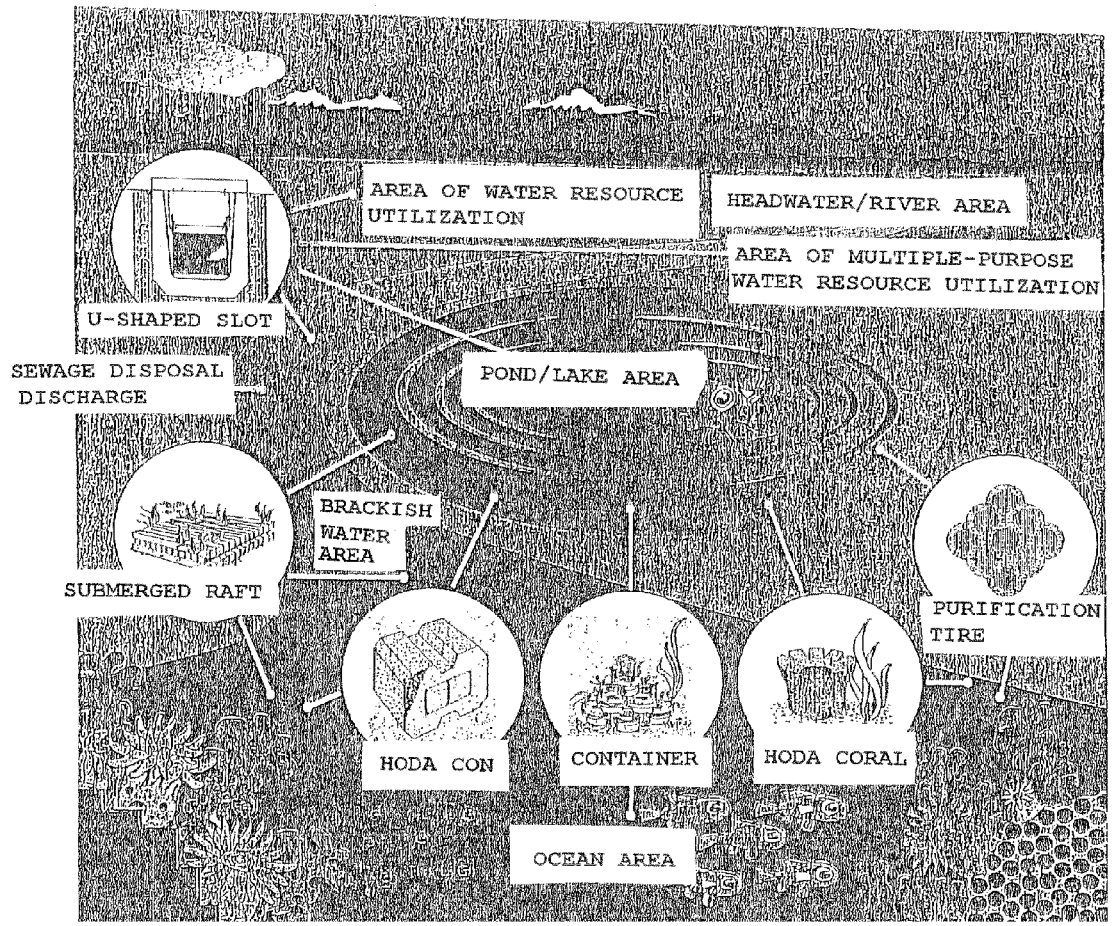
FIG. 4 is a flowchart of water area purification system using the filter medium of FIG. 1.
Figure 5:
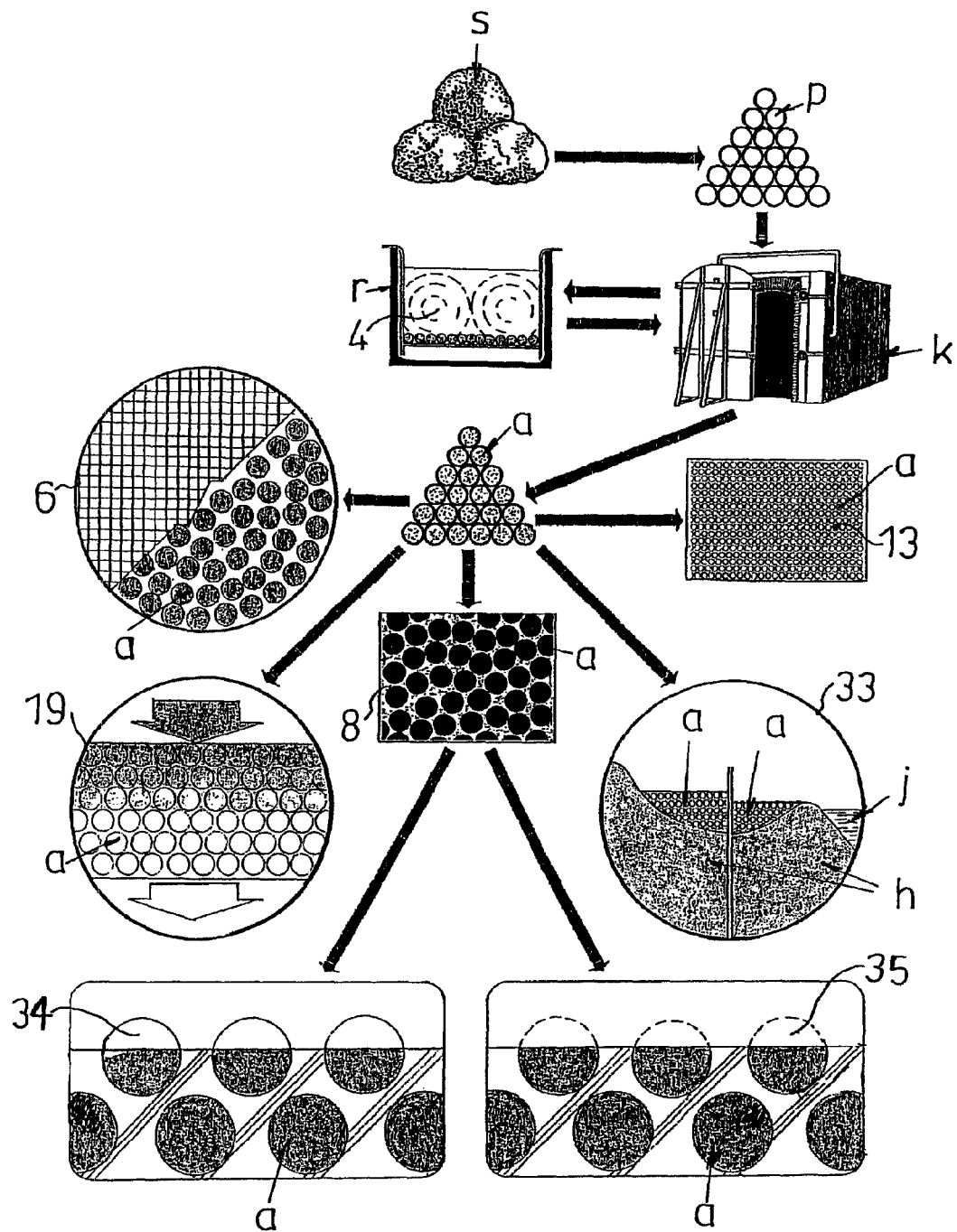
FIG. 5 shows a flowchart of the steps to form the filter medium of FIG. 1 and the entire system that allows the filter medium to be applied to various fields.
Figure 6:
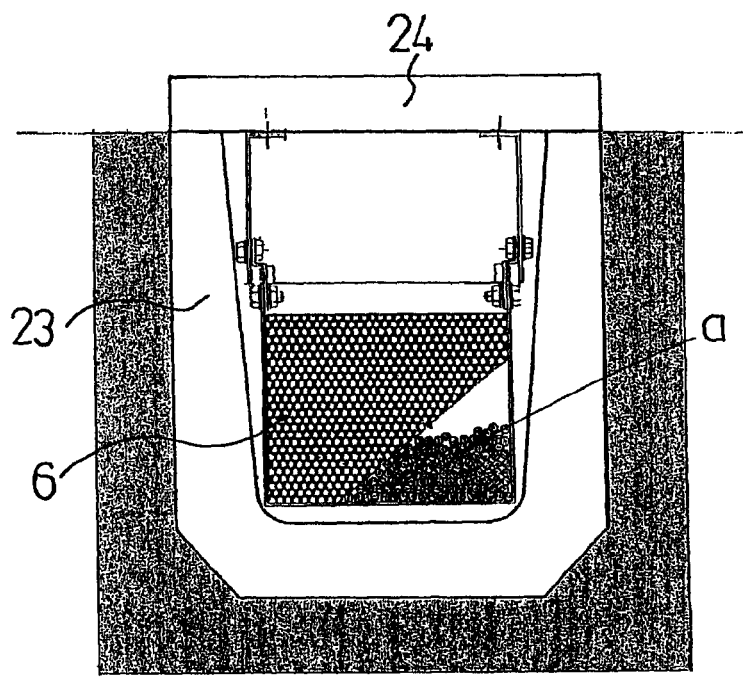
FIG. 6 is a longitudinal section showing the application of the filter medium of FIG. 1 in an existing sewage drainage ditch for the purpose of purification.

Next, the filter medium a obtained as above is installed underwater in contaminated water and thereby purifying contaminated water as follows. The following describes the mechanism (FIG. 2).

The eco-resource filter medium a of the present invention, which is a filter medium processed from a slag, works as follows. When the surface region 1 of the filter medium a is brought into contact with contaminated water as shown in FIG. 2, contaminated water undergoes a catalytic reaction with, and processed object components are highly decomposed or broken down. As a result, harmful substances are neutralized, and offensive odors are removed, normalizing polluted water.

The reasons therefor are as follows. As described regarding the components of natural ores, because the whole filter medium a is a vitrified solid matter containing a liquid glaze made of a natural ore as a main component, such a filter medium a has a mechanism equal to or higher than that of the natural ore.

Further, although other methods than the decomposition method utilizing a catalytic reaction of the filter medium a according to the present invention are disadvantageous for their low processing capacity and slow speed, the system of the filter medium a of the present invention is advantageous for its high processing capacity and high speed.

The reasons therefor are as follows. A glaze is applied to the filter medium a in the form of a solid matter, and the glaze penetrates into the whole solid matter, which is then calcined (melted) at a high temperature to cause vitrification. As a result, the component 5 of the glaze is provided with specific infrared energy. When the surface of such a filter medium a receives a specific light wave, the component of the glaze functions to absorb the light wave.

Also, in the filter medium a of the present invention, there is a light wave absorption wavelength peculiar to contaminated water, and the wavelength absorbed by normal water is different from that by polluted water. When the wavelength absorbed by water agrees with the light wave wavelength, resonance is caused, whereby the electrostatic energy of the filter medium a transfers to water (deflection angle/stretching vibration). This results in a catalytic reaction, thereby causing decomposition and breakdown. This action is equally exhibited on fresh water and seawater.

Further, the presence of an infrared electrostatic energy wavelength in the completed filter medium a has been proved by the analysis "infrared spectral emissivity test" (FIG. 22). Further, this electrostatic energy is infinite, so unless the filter medium a disappears, the energy continues to be exerted and water continues to receive the same. In the cases of other "adhesion/adsorption" processes, due to clogging, close maintenance and management is required. In contrast, the "decomposition/breakdown" process of the filter medium a of the present invention has a long life and does not require maintenance, and, therefore, it is featured by its capability of being used as installed underwater in the entire water area.

An object of the filter medium a of the present invention is the purification of contaminated water. In addition to this, in recent years, due to an increase in sea temperature, seawater damage in the ocean has been expanding, causing increasing damage to the fishing industry. It has been revealed that the increase in sea temperature is not only because of global warming, and that the contamination of water area also causes such a sea temperature increase.

That is, a contaminated water area abnormally absorbs solar heat, and thus the incidence of plankton increases. It has been also revealed that damage on the fishing industry, such as one by Echizen jellyfish, occurs particularly in the contaminated ocean area. The purification of the contaminated water area has been an important subject, so the activity of the filter medium a of the present invention is expected.

As the purification filter medium a of the present invention is used with an increased frequency, slags for use in the present invention find wider applications. Also, with a shift in the application of slag from the conventional land civil engineering works to water civil engineering works, the utility value of slags is increased. This can be a change to invent a new business "water civil engineering works".

When the filter medium a is used as enclosed generally in a basket 6, a net, or the like, in such a state that the filter medium a can contact contaminated water, the enclosed filter medium a is used as installed underwater in a water area or hung in a sewage pipe such as a drainage. When used as above, the filter medium a purifies contaminated water and at the same time remove an offensive odor.

Further, as in the eighth embodiment, the filter medium a is kneaded with sand and hydrated concrete to form a concrete molded article 8, and the surface of the concrete molded article is treated by a technique such as washing away or scraping off so that the filter medium a is exposed and can contact contaminated water Further, the molded article 8 is not used only for the purification of the ocean. By successively using such molded articles in a water area route of the entire water area flowing into the ocean from the upstream to the downstream, the inflow of contaminants into the ocean can be prevented.

In addition, by purifying the entire water area, the ocean g can be revived to the original state, that is, the normal state. Accordingly, this is expected to stop the increase in seawater damage and promote the growth of seaweeds.

Figure 21:
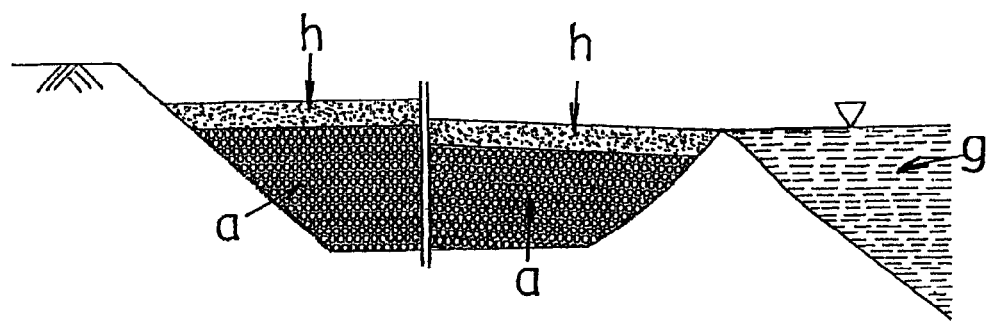
FIG. 21 is a partially cutaway longitudinal front view of the ocean and the beach where the filter medium of FIG. 1 is used as a beach-graveling/nourishing example.
Figure 2:
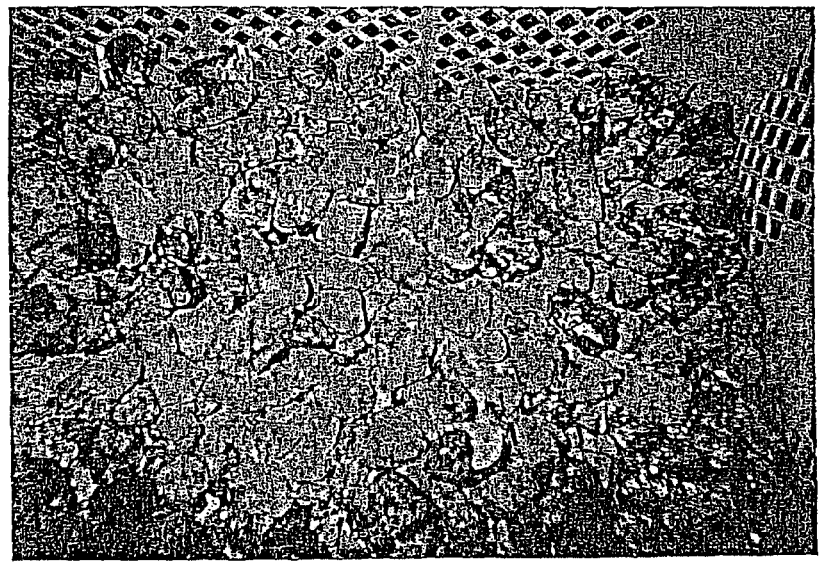
Figure 2:
Figure 2:
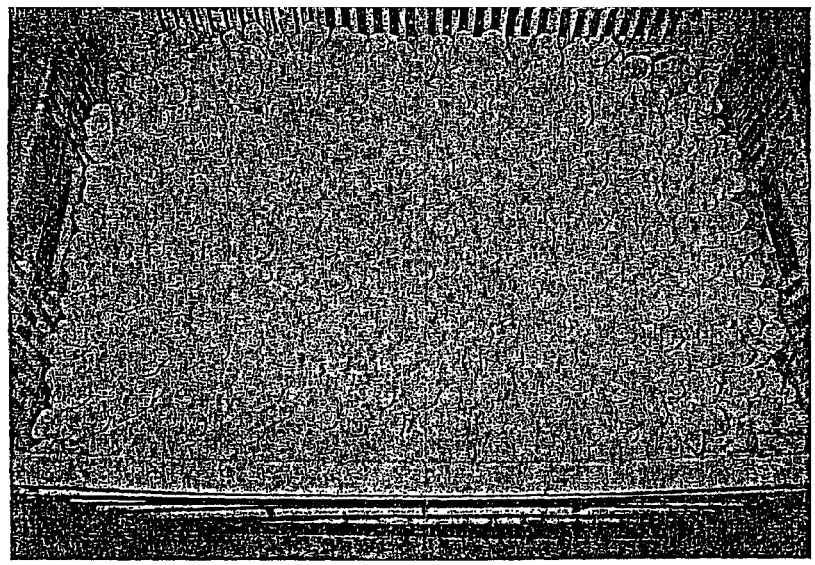
Figure 2:
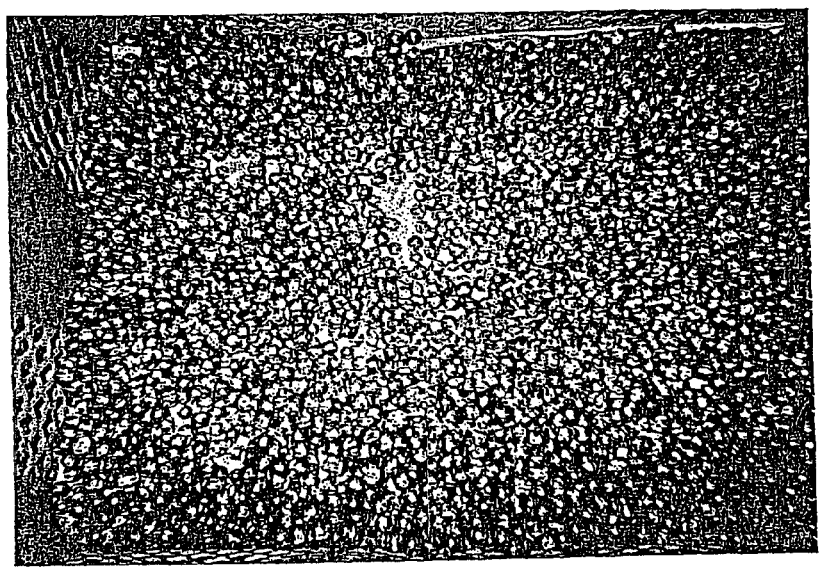

The filter medium a of the present invention may also be used not only for water area purification but also as a material for reviving the erosion of a coastal sand hill 33 as described in the sixth embodiment (FIG. 21).

In recent years, sand hill erosion is caused by an increase in seawater. All over the country, about 160 ha (about 34 times bigger than TOKYO DOME) of the region along the ocean has been eroded every year.

It has been revealed that although wave-dissipating blocks are not effective in preventing erosion, when the beach is graveled, sea sand h naturally collect in gaps between gravels, and the sand is recovered in the beach in about two months. Therefore, the filter medium a of the present invention may be pulverized into the shape of gravels with a size of φ10 to 20 or the formed filter medium a may be pulverized to a gravel-like size, and used for graveling, whereby the filter medium a can be utilized as a beach-graveling/nourishing material.

Also, the surface of the filter medium a of the present invention may be subjected to polishing 35 by the above mentioned technique such as washing out or scraping off, thereby allowing an application with a road pavement material such as an interlocking block 9 or an exterior tile 10.

Further, when the filter medium a of the present invention is used as a pavement material, such a filter medium a is expected to remove contaminated water on the road surface and prevent the inflow of the contaminated water into a river or the like.

Also, the filter medium a absorbs solar heat by a color treatment on the raw material, and thus is expected to reduce the heat island effects in a metropolis.

Further, the livestock excreta combustion slag according to the fifth embodiment may be further pulverized into granules, mixed in the soil 11 of an existing field with a spade, and used as a soil-reviving material.

The soil 11 has lost its function due to agricultural chemicals, acid rain, etc. Although attempts have been made to recover the soil using compost 12 by organic farming, etc., in the case where the soil itself is spoiled by agricultural chemicals, etc., recovery is not possible only by compost.

The granular filter medium 13 of the present invention may be mixed with an existing field soil 14 and compost 12, and then mixed in a soil 11 using a spade to give a mixed soil 16. The spectrum of the filter medium 13 due to rainfall or sprinkling corresponds to the spectrum of contaminated water, promoting the humification and maturation of the compost 12, and also, earthworms and microorganisms grow owing to fermentation. This thus is expected to be effective in reviving the soil spoiled by agricultural chemicals or the like into the original soil.

It is also possible to finely pulverize the granular filter medium 13 of the present invention and mix with water, and sprinkle the mixture using a sprinkler or the like, so as to improve and enrich the soil. The reference numeral 17 is an agricultural product planted in a mixed soil 16.

In the filtration of livestock urine of according to the tenth embodiment, the filter medium a of the present invention is enclosed in a filter basket 18, urine is penetrated and filtered therethrough from the top twice or three times. As a result, the offensive odor of urine can be removed. The reference numeral 19 is a filter pit, 20 is a urine guide pipe, 21 is a filtered liquid storing portion, and 22 is a drain pipe.

As a result of the measurement of a BOD value that indicates the degree of contamination, it was shown that the oxygen amount required for aerobic bacteria to perform oxidative degradation of organic substances in the urine was greatly reduced as compared with raw water.

This is thus effective in preventing contamination of a river or the like by the direct discharge of livestock urine and also in solving the problems of offensive odors which have been bothering livestock breeders and residents.

With respect to examples of the present invention, the following describes the specific details with reference to the drawings.

Figure 7:
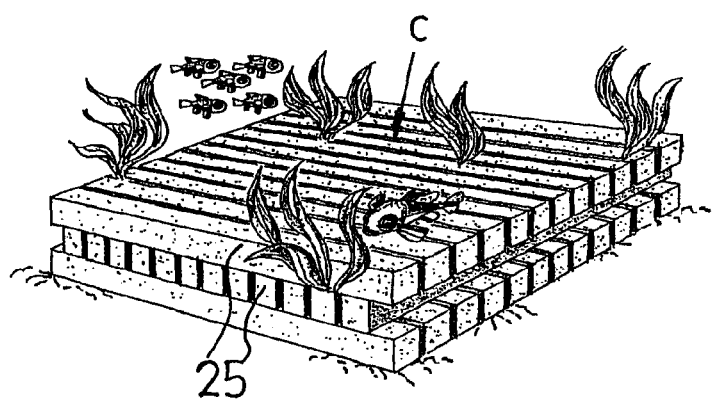
FIG. 7 is a perspective view showing the state of installation of the filter medium of FIG. 1 as an underwater raft for the purification of a brackish water area.

In FIG. 7, as mentioned above, the filter medium a of the present invention is placed in a basket 6, and is hung or installed underwater in a U-shaped slot 23 or the like that is used as an existing sewage drainage ditch, whereby the filter medium a purifies contaminated water and remove an offensive odor. This thus is advantageous in that the outflow of contaminated water can be prevented, and the living environment can be protected from malodor pollution.

The reference numeral 24 is a lid portion of the drainage U-shaped slot 23.

Figure 8:
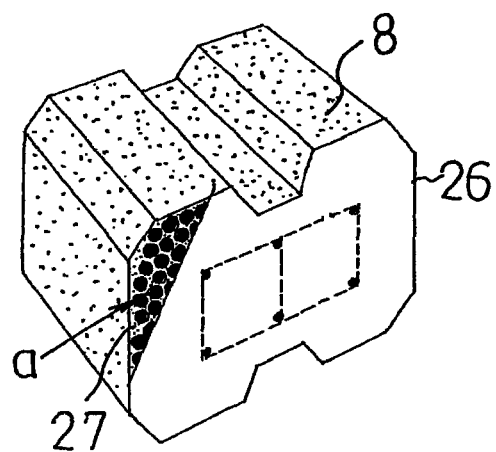
FIG. 8 is a perspective view showing the state of scraping off of a concrete kneaded/shaped molded article containing the filter medium of FIG. 1.

The following describes an underwater raft c for the purification of a brackish water area shown in FIG. 8.

The underwater raft c is used as installed underwater in a brackish water area where fresh water mixes with seawater.

The configuration is as follows. A hydrated concrete 25, a slag filter medium of the present invention, and a pulverized fine powder of a filter medium are kneaded and solidified to give a raft material 25. Then, a surface region of the raft material 25 is processed by scraping off 34 or the like to expose the filter medium a.

Such exposure allows contact with brackish water, thereby effecting purification in the brackish water area.

A brackish water area is an important place where fish and shellfish spawn. However, there is no place for spawning due to the contamination of the water area, and this also is a cause of a decrease in the number of fish and shellfish.

Accordingly, the raft c provides a spawning site, and fish and shellfish spawn in the purified area using the spaces in the raft c.

Figure 9:
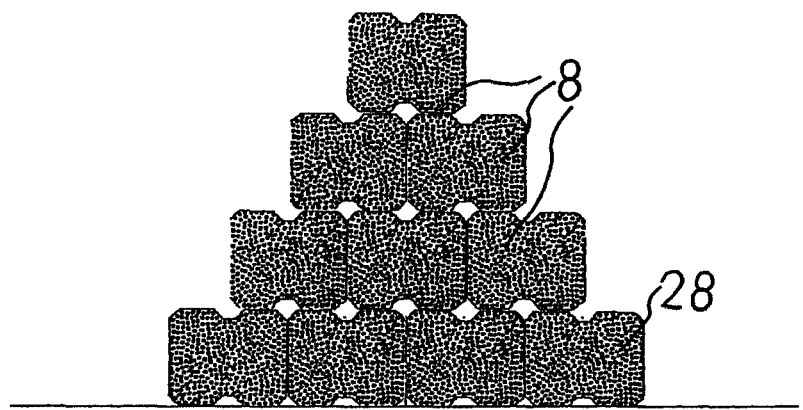
FIG. 9 shows the construction of a fish reef using a pile of molded articles of FIG. 8.
Figure 10:
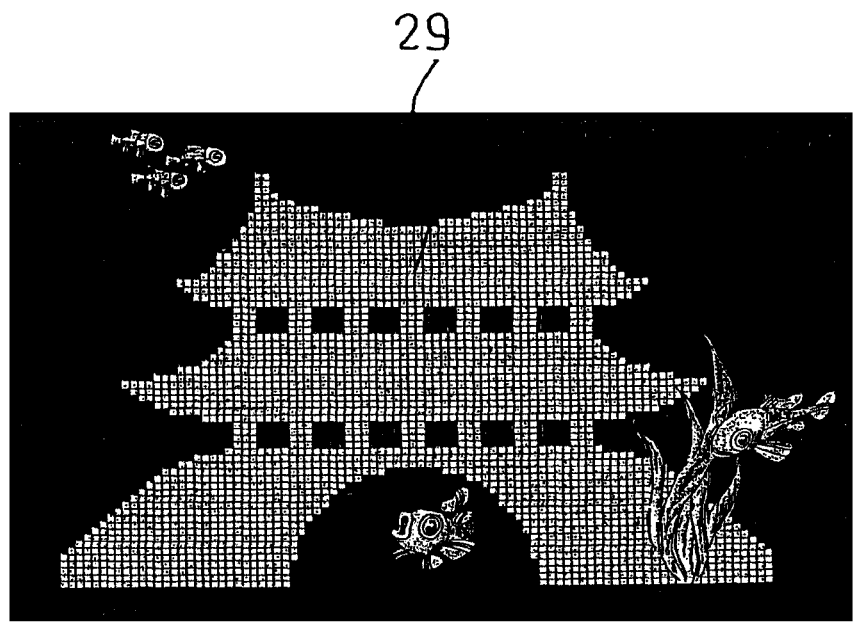
FIG. 10 shows an example of the construction of a sea-bed mosaic fish reef using molded articles of FIG. 8.
Figure 11:
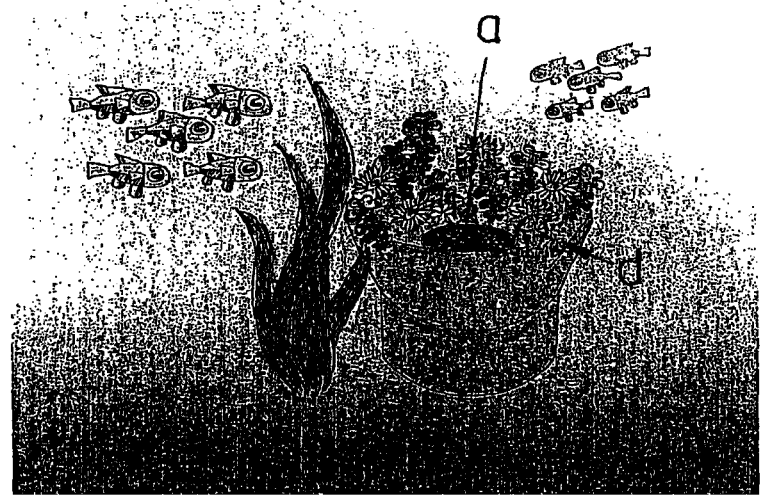
FIG. 11 is a perspective view of a concrete artificial coral frame-like molded article containing the filter medium of FIG. 1.
Figure 1:
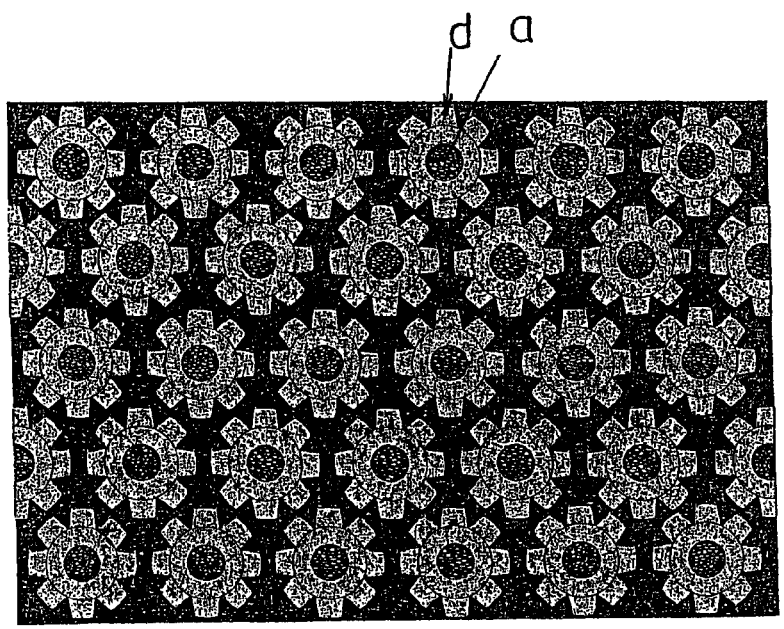
Figure 1:
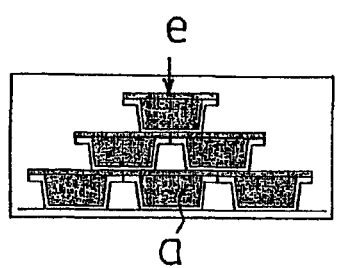

Further, according to the present invention, as shown in FIGS. 8 and 9, a concrete kneaded/shaped frame-like molded article 26 is formed from the filter medium a, and the surface region 27 of the molded article 26 is scraped off. The resulting product may be constructed into a fish reef 28 by accumulation as shown in FIGS. 9 and 10 or into as a seabed mosaic fish reef 29 of a as shown in FIG. 10, and installed underwater on the seabed. As a result, the ocean area can be purified, and seaweeds adhere and grow thereon, allowing fish and shellfish to spawn as above.

Further, upon the underwater installation, such products may be arranged to draw a mosaic of Ryugu-jo (undersea palace of the god of the sea) or the like. As a result, while purifying and reviving the ocean, they can serve as a tool for sending messages regarding the purification of sea pollution.

The present invention may be used for achieving the underwater installation for in the entire water area including fresh water, seawater, and brackish water areas as follows.

That is, a slag filter medium a of the present invention, a pulverized fine powder of a filter medium capable of purifying and restoring contaminated or polluted water, and hydrated concrete are kneaded and shaped to give an artificial coral body d. Then, the filter medium a of the present invention is placed in the artificial coral body d, and used as installed underwater on the seabed or the like. Therefore, purification and revival of the water area can be achieved, promoting the growth of corals and seaweeds including kelp. It is also possible to previously plant coral or seaweed seedlings on edges of the artificial coral body d and install such a coral body d underwater.

Upon underwater installation, when used in a river, such coral bodies d may be arranged like natural stones, while when used in a lake, a pond, the ocean, or the like, they may be used in a pile to serve as a fish reef.

Figure 14:
FIG. 14 is a perspective view of the piled concrete cases of FIG. 13.

Further, as shown in FIGS. 13 and 14, the filter medium a of the present invention is used as a concrete container case e. The container case e is used as installed underwater in the ocean, a lake, a pond, or the like.

The container case e is used as follows. The filter medium a of the present invention and a humus soil mass are alternately enclosed in a concrete case e with a lid, which is made of hydrated concrete and a pulverized fine powder of the filter medium a capable of purifying and restoring contaminated or polluted water, and used as installed underwater.

As a result of such underwater installation, while purifying and reviving the water area, nutritive substances can be supplied to the water area at the same time. Therefore, this is effective in the implantation and growth of corals and seaweeds and also in providing spawning sites for fish and shellfish.

Figure 15:
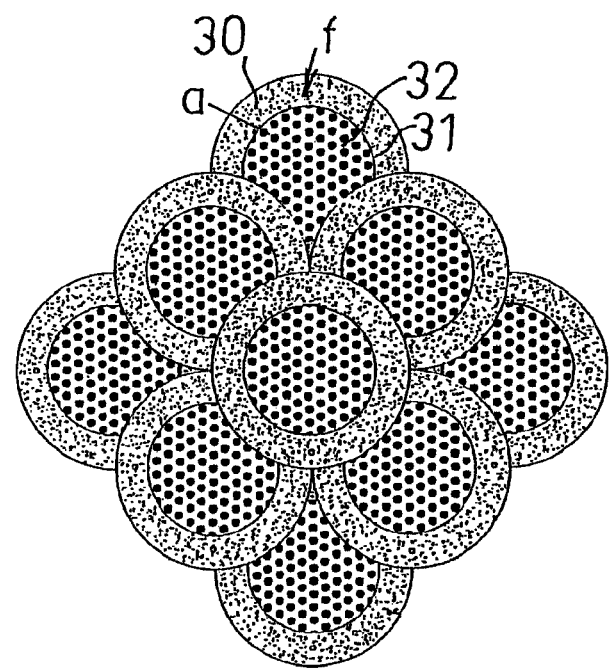
FIG. 15 is a plan view of the state where discarded tires packed with the filter medium of FIG. 1 are piled up.
Figure 16:
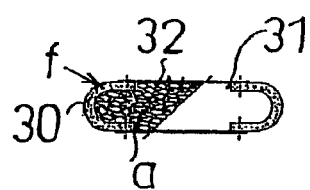
FIG. 16 is a partially cutaway longitudinal section of the tire of FIG. 15.
Figure 17:
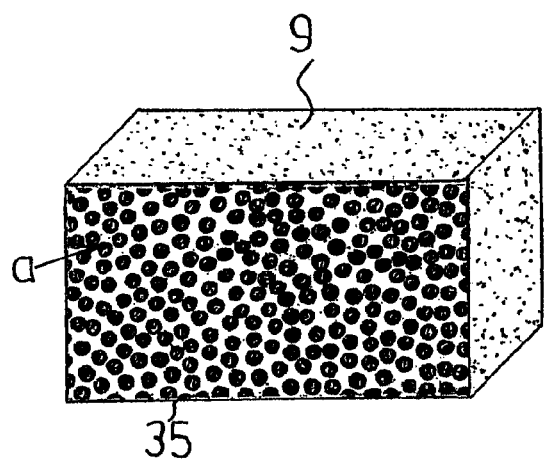
FIG. 17 is a perspective view of an interlocking block containing the filter medium of FIG. 1, as finished by polishing the filter medium.
Figure 18:
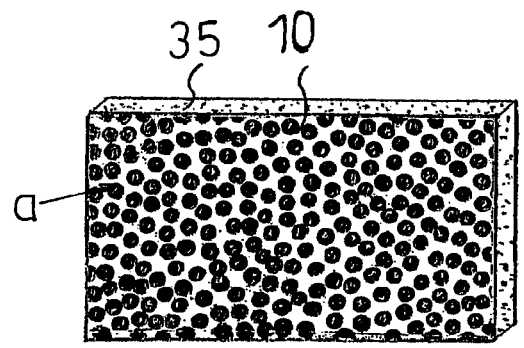
FIG. 18 is a perspective view of an exterior tile, as finished by polishing a concrete slab containing a filter medium kneaded therein.
Figure 19:
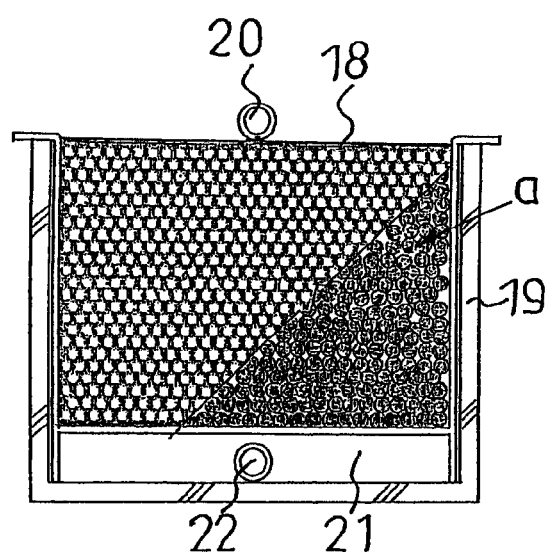
FIG. 19 is a partially cutaway front view of a livestock excreted urine filtration apparatus using the filter medium of FIG. 1.
Figure 20:
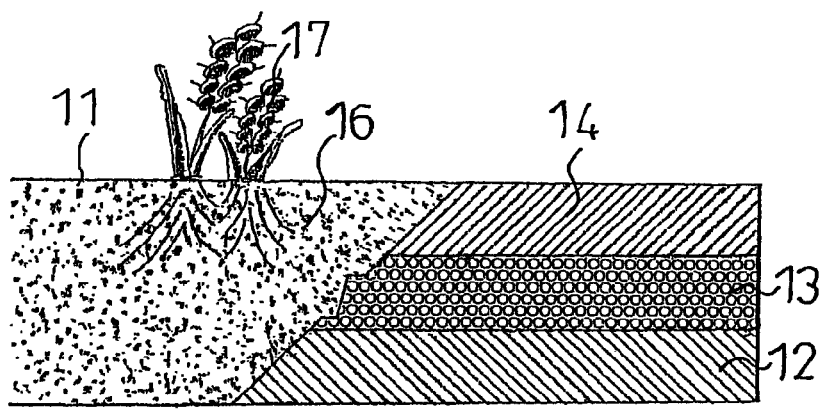
FIG. 20 a partially cutaway longitudinal section showing the state of soil revival using granules obtained by pulverizing the filter medium of FIG. 1.

The filter medium a of the present invention can also be applied as a case f utilizing a discarded automobile tire and used as installed underwater installation in the ocean, a lake, a pond, or the like as shown in FIGS. 15 and 16. The tire case f is configured to include a discarded tire 30 having an opening 31, together with a lid 32 made of a punching metal, a wire mesh, or the like on the opening 31. Before covering with the lid 32, the slag filter medium a of the present invention is enclosed therein, followed by fixing with a bolt. The tire case f is thus formed.

Further, a plant fiber material, such as a hemp material, as a base material may be sprayed to the surface of the tire 30 and dried, followed by underwater installation of such a case f. As a result, seaweeds and algae are implanted therein, and the case f can serve as a spawning site for fish and shellfish while performing purification and revival.

It is also possible to spray chopped pieces of seaweeds and algae to the base material in advance, and install the case underwater after they develop roots. The reference character s is a finely pulverized slag, and R is a liquid glaze impregnation bath.

What is claimed is:

1. An eco-resource slag effective utilization system for neutralizing a harmful-substance-containing unused slag to allow the same to be used as an eco-resource filter medium, the eco-resource slag effective utilization system comprising:
   a first step of kneading predetermined proportions of a non-recyclable harmful-substance-containing unused slag selected from by-product slags produced during the refining of a metal such as iron, copper, or aluminum from an ore, a porcelain clay for ceramics, and a mineral clay for ceramics, such as a quartz powder or an alumina powder, thereby forming a clay material with a suitable size;

a second step of burning the clay material in a burning oven for ceramics at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a fourth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics again at a predetermined temperature for a predetermined period of time, so that a harmful component contained in the unused slag is melted and enclosed in a vitreous material, thereby forming a vitreous filter medium made of a vitreous solid matter capable of purifying and restoring contaminated or polluted water; and a sixth step of installing the filter medium formed in the fifth step underwater in a contaminated water area to purify water and revive normal water.

2. An eco-resource slag effective utilization system for neutralizing a harmful-dioxin-containing waste incineration ash slag that has not been processed into a molten slag, thereby allowing the same to be used as an eco-resource filter medium, the eco-resource slag effective utilization system comprising:

a first step of kneading predetermined proportions of a harmful-dioxin-containing slag that has not been processed into a molten slag, which is selected from waste incineration ash slags generated during the burning of general wastes in a combustible waste incineration plant, a porcelain clay for ceramics, and a mineral clay for ceramics, such as a quartz powder or an alumina powder, thereby forming a clay material with a suitable size;

a second step of burning the clay material in a burning oven for ceramics or wastes at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a fourth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics or wastes at a predetermined temperature for a predetermined period of time, so that a harmful component contained in the harmful-dioxin-containing slag is melted and enclosed in a vitreous material, thereby forming a vitreous filter medium made of a vitreous solid matter capable of purifying and restoring contaminated or polluted water; and a sixth step of installing the filter medium formed in the fifth step underwater in a contaminated water area to purify water and revive normal water.

3. An eco-resource slag effective utilization system for neutralizing a harmful-component-containing unprocessed sludge slag to allow the same to be used as an eco—resource filter medium, the eco-resource slag effective utilization system comprising:

a first step kneading predetermined proportions of a harmful component—containing sludge slag that has not been processed into a sludge molten slag, which is selected from sewage sludge slags generated during the production of sewage sludge in a sewage treatment plant, a porcelain clay for ceramics, and a mineral clay for ceramics, such as a quartz powder or an alumina powder, thereby forming a clay material with a suitable size;

a second step of burning the clay material in a burning oven for ceramics or melting at a predetermined temperature for a predetermined period of time so that a liquid glaze can sufficiently penetrate into the inner region of the clay material, thereby forming a biscuit clay material;

a third step of applying, to the biscuit clay material formed in the second step, a liquid glaze produced by kneading a powder made from a crushed special natural stone with a glaze for ceramics in a predetermined ratio followed by aging;

a fourth step of penetrating the liquid glaze sufficiently into the inner region of the biscuit clay material, thereby making a solid matter;

a fifth step of subjecting the solid matter impregnated with the liquid glaze to high-temperature burning in a burning oven for ceramics or melting again at a predetermined temperature for a predetermined period of time, so that a harmful component contained in the sludge slag is melted and enclosed in a vitreous material, thereby forming a vitreous filter medium made of a vitreous solid matter capable of purifying and restoring contaminated or polluted water; and a sixth step of installing the filter medium formed in the above step underwater in a contaminated water area to purify contaminated water or the like and revive normal water.

4. The eco-resource slag effective utilization system according to claim 1, wherein the harmful-substance-containing unused slag comprises a harmful-component-containing coke slag, the eco-resource slag effective utilization system comprising:

installing a slag obtained by finely pulverizing a harmful-component-containing coke incineration residue generated during the burning of coals in a thermal power generation facility, together with a filter medium made from the coke incineration residue slag in the same manner as in the steps 1 to 5 of the production of a solid matter in claim 1, and installing the filter material underwater in a contaminated water area to purify contaminated water or the like and revive normal water.

5. The eco-resource slag effective utilization system according to claim 1, wherein the harmful-substance-containing unused slag comprises a harmful-component-containing livestock excreta slag, the eco-resource slag effective utilization system comprising:

finely pulverizing an excreta slag obtained by drying and burning harmful excreta from livestock such as cows and pigs, together with a filter medium made from the excreta slag in the same manner as in the steps 1 to 5 of the production of a solid matter in claim 1, into granules; and mixing the granules in soil to enrich the soil and revive normal soil.

6. An eco-resource slag effective utilization system for allowing the eco-resource filter medium obtained according to claim 1 to be effectively used as a beach-graveling/nourishing resource, the eco-resource slag effective utilization system comprising, with respect to an eroded area of a coastal sand hill:
   mixing coastal sand-hill residual sand and the filter medium in a predetermined ratio; and
   using the resulting mixture to gravel an eroded area of a sand hill, so as to revive parts eroded by a high wave and prevent such erosion.

7. An eco-resource slag effective utilization system for allowing the eco-resource filter medium obtained according to claim 1 to be effectively used as a resource for removing contaminated water flowing into an existing sewerage drainage ditch, the eco-resource slag effective utilization system comprising, with respect to an existing sewage drainage ditch for living drainage, municipal drainage, industrial drainage, or the like:
   enclosing the filter medium in a mesh bag, a wire mesh cage, or the like; and
   installing or hanging the enclosing bag or cage underwater in an existing sewage drainage ditch, thereby removing an offensive odor in the drainage ditch and purifying contaminated water flowing into the drainage ditch.

8. An eco-resource slag effective utilization system, comprising, with respect to a contaminated water area in a river, a pond, a lake, the ocean, or the like:
   kneading, together with water, the slag solid matter obtained according to claim 1 and a fine powder of a steel slag and a blast furnace slag produced as by-products in a steelmaking process, followed by solidification of the resulting mixture by a hydration reaction, and further fine pulverization of the resulting solid;
   mixing the resulting product with natural sand for use in civil engineering works in a predetermined ratio, following by kneading with additional water and casting into a mold with a suitable size and a suitable shape, thereby forming a concrete filter medium;
   exposing only the kneaded filter medium to the outside by treating a half-dry surface of the concrete solid matter with a technique such as washing away by application of a hydraulic pressure, scraping off with a wire brush, or the like, thereby forming a block for underwater installation, a wave-dissipating block, a block for shore protection works, or the like; and
   using the resulting blocks successively from upstream in a headwater area to a downstream ocean in a final flow-in area in such a manner that the blocks contact contaminated water in a fresh water area, a seawater area, a brackish water area, or the like, thereby allowing the same to be effectively used as a resource for purifying and reviving a contaminated water area.

9. An eco-resource slag effective utilization system, comprising, with respect to a road surfade material for paving a sidewalk or the like, such as an interlocking block or an exterior tile:
   mixing the slag filter medium obtained according to claim 1, a ground product of a steelmaking slag or a hydrated solidified body, and natural sand for use in civil engineering works in a predetermined ratio, followed by addition of water and casting into a mold in the shape of an interlocking block or a tile, thereby forming a road surface material;
   exposing only the kneaded filter medium to the outside with a technique such as washing away by application of a hydraulic pressure, scraping off, or the like, followed by drying;
   polishing a surface of the resulting dried product using a polishing machine or the like to make the surface flat; and
   using the resulting product as a material for paving the surface of a road such as a sidewalk or the like in the same manner as in ordinary pavement using an interlocking block or an exterior tile, thereby allowing the same to be efficiently used as a resource for reducing heat island effects on a paved road surface and purifying a contaminant or the like that floods a paved road surface.

10. An eco-resource slag effective utilization system for allowing the eco-resource filter medium obtained according to claim 1 to be used as a resource for removing a BOD component contained in livestock urine, the eco-resource slag effective utilization system comprising, with respect to livestock excreta of cows, pigs, and the like:
   in a urine disposal method, filtering livestock urine two or three times through the filter medium and a predetermined amount of the filter medium enclosed in a filtration apparatus made of a wire mesh or the like so as to achieve a reduction of a harmful BOD component contained in the urine, thereby simplifying ordinary excreta disposal and enabling the discharge of harmless urine.

11. An eco-resource slag effective utilization system for allowing the eco-resource filter medium obtained according to claim 2 to be effectively used as a beach-graveling/nourishing resource, the eco-resource slag effective utilization system comprising, with respect to an eroded area of a coastal sand hill:
   mixing coastal sand-hill residual sand and the filter medium in a predetermined ratio; and
   using the resulting mixture to gravel an eroded area of a sand hill, so as to revive parts eroded by a high wave and prevent such erosion.

12. An eco-resource slag effective utilization system for allowing the eco-resource filter medium obtained according to claim 2 to be effectively used as a resource for removing contaminated water flowing into an existing sewerage drainage ditch, the eco-resource slag effective utilization system comprising, with respect to an existing sewage drainage ditch for living drainage, municipal drainage, industrial drainage, or the like:
   enclosing the filter medium in a mesh bag, a wire mesh cage, or the like; and
   installing or hanging the enclosing bag or cage underwater in an existing sewage drainage ditch, thereby removing an offensive odor in the drainage ditch and purifying contaminated water flowing into the drainage ditch.

13. An eco-resource slag effective utilization system, comprising, with respect to a contaminated water area in a river, a pond, a lake, the ocean, or the like:
   kneading, together with water, the slag solid matter obtained according to claim 2 and a fine powder of a steel slag and a blast furnace slag produced as by-products in a steelmaking process, followed by solidification of the resulting mixture by a hydration reaction, and further fine pulverization of the resulting solid;
   mixing the resulting product with natural sand for use in civil engineering works in a predetermined ratio, following by kneading with additional water and casting into a mold with a suitable size and a suitable shape, thereby forming a concrete filter medium;

exposing only the kneaded filter medium to the outside by treating a half-dry surface of the concrete solid matter with a technique such as washing away by application of a hydraulic pressure, scraping off with a wire brush, or the like, thereby forming a block for underwater installation, a wave-dissipating block, a block for shore protection works, or the like; and using the resulting blocks successively from upstream in a headwater area to downstream ocean in a final flow-in area in such a manner that the blocks contact contaminated water in a fresh water area, a seawater area, a brackish water area, or the like, thereby allowing the same to be effectively used as a resource for purifying and reviving a contaminated water area.

14. An eco-resource slag effective utilization system, comprising, with respect to a road surface material for paving a sidewalk or the like, such as an interlocking block or an exterior tile:

mixing the slag filter medium obtained according to claim 2, a ground product of a steelmaking slag or a hydrated solidified body, and natural sand for use in civil engineering works in a predetermined ratio, followed by addition of water and casting into a mold in the shape of an interlocking block or a tile, thereby forming a road surface material;

exposing only the kneaded filter medium to the outside with a technique such as washing away by application of a hydraulic pressure, scraping off, or the like, followed by drying;

polishing a surface of the resulting dried product using a polishing machine or the like to make the surface flat; and using the resulting product as a material for paving the surface of a road such as a sidewalk or the like in the same manner as in ordinary pavement using an interlocking block or an exterior tile, thereby allowing the same to be efficiently used as a resource for reducing heat island effects on a paved road surface and purifying a contaminant or the like that floods a paved road surface.

15. An eco-resource slag effective utilization system for allowing the eco-resource filter medium obtained according to claim 2 to be used as a resource for removing a BOD component contained in livestock urine, the eco-resource slag effective utilization system comprising, with respect to livestock excreta of cows, pigs, and the like:

in a urine disposal method, filtering livestock urine two or three times through the filter medium and a predetermined amount of the filter medium enclosed in a filtration apparatus made of a wire mesh or the like so as to achieve a reduction of a harmful BOD component contained in the urine, thereby simplifying ordinary excreta disposal and enabling the discharge of harmless urine.

16. An eco-resource slag effective utilization system for allowing the eco-resource filter medium obtained according to claim 3 to be effectively used as a beach-graveling/nourishing resource, the eco-resource slag effective utilization system comprising, with respect to an eroded area of a coastal sand hill:

mixing coastal sand-hill residual sand and the filter medium in a predetermined ratio; and using the resulting mixture to gravel an eroded area of a sand hill, so as to revive parts eroded by a high wave and prevent such erosion.

17. An eco-resource slag effective utilization system for allowing the eco-resource filter medium obtained according to claim 3 to be effectively used as a resource for removing contaminated water flowing into an existing sewerage drainage ditch, the eco-resource slag effective utilization system comprising, with respect to an existing sewage drainage ditch for living drainage, municipal drainage, industrial drainage, or the like:

enclosing the filter medium in a mesh bag, a wire mesh cage, or the like; and installing or hanging the enclosing bag or cage underwater in an existing sewage drainage ditch, thereby removing an offensive odor in the drainage ditch and purifying contaminated water flowing into the drainage ditch.

18. An eco-resource slag effective utilization system, comprising, with respect to a contaminated water area in a river, a pond, a lake, the ocean, or the like:

kneading, together with water, the slag solid matter obtained according to claim 3 and a fine powder of a steel slag and a blast furnace slag produced as by-products in a steelmaking process, followed by solidification of the resulting mixture by a hydration reaction, and further fine pulverization of the resulting solid;

mixing the resulting product with natural sand for use in civil engineering works in a predetermined ratio, following by kneading with additional water and casting into a mold with a suitable size and a suitable shape, thereby forming a concrete filter medium;

exposing only the kneaded filter medium to the outside by treating a half-dry surface of the concrete solid matter with a technique such as washing away by application of a hydraulic pressure, scraping off with a wire brush, or the like, thereby forming a block for underwater installation, a wave-dissipating block, a block for shore protection works, or the like; and using the resulting blocks successively from upstream in a headwater area to downstream ocean in a final flow-in area in such a manner that the blocks contact contaminated water in a fresh water area, a seawater area, a brackish water area, or the like, thereby allowing the same to be effectively used as a resource for purifying and reviving a contaminated water area.

19. An eco-resource slag effective utilization system, comprising, with respect to a road surface material for paving a sidewalk or the like, such as an interlocking block or an exterior tile:

mixing the slag filter medium obtained according to claim 3, a ground product of a steelmaking slag or a hydrated solidified body, and natural sand for use in civil engineering works in a predetermined ratio, followed by addition of water and casting into a mold in the shape of an interlocking block or a tile, thereby forming a road surface material;

exposing only the kneaded filter medium to the outside with a technique such as washing away by application of a hydraulic pressure, scraping off, or the like, followed by drying;

polishing a surface of the resulting dried product using a polishing machine or the like to make the surface flat; and using the resulting product as a material for paving the surface of a road such as a sidewalk or the like in the same manner as in ordinary pavement using an interlocking block or an exterior tile, thereby allowing the same to be efficiently used as a resource for reducing heat island effects on a paved road surface and purifying a contaminant or the like that floods a paved road surface.

20. An eco-resource slag effective utilization system for allowing the eco-resource filter medium obtained according to claim 3 to be used as a resource for removing a BOD component contained in livestock urine, the eco-resource slag effective utilization system comprising, with respect to livestock excreta of cows, pigs, and the like:

in a urine disposal method, filtering livestock urine two or three times through the filter medium and a predetermined amount of the filter medium enclosed in a filtration apparatus made of a wire mesh or the like so as to achieve a reduction of a harmful BOD component contained in the urine, thereby simplifying ordinary excreta disposal and enabling the discharge of harmless urine.

* * * * *